United States Patent [19]
Huang et al.

[11] Patent Number: 5,574,900
[45] Date of Patent: Nov. 12, 1996

[54] SYSTEM AND METHOD FOR OPTIMIZING PARALLEL PROCESSING OF DATABASE QUERIES

[75] Inventors: Daniel T. Huang; Eileen T. Lin, both of San Jose; Yun Wang, Saratoga, all of Calif.

[73] Assignee: International Business Machines Corporation, Armonk, N.Y.

[21] Appl. No.: 201,822

[22] Filed: Feb. 25, 1994

[51] Int. Cl.$^6$ .................................................. G06F 17/30
[52] U.S. Cl. .................... 395/601; 395/561; 364/DIG. 1; 364/282.4; 364/281
[58] Field of Search ........................................ 395/600, 650

[56] References Cited

U.S. PATENT DOCUMENTS

| | | | |
|---|---|---|---|
| 4,769,772 | 9/1988 | Dwyer | 395/600 |
| 5,121,494 | 6/1992 | Dias et al. | 395/600 |
| 5,325,525 | 6/1994 | Shan et al. | 395/650 |
| 5,335,345 | 8/1994 | Frieder et al. | 395/600 |
| 5,345,585 | 9/1994 | Iyer et al. | 395/600 |

OTHER PUBLICATIONS

Hong et al, "Optimization of Parallel Query Execution Plans in XPRS", Proceedings of the First International Conference on Parallel and Distributed Information Systems, 4–6 Dec. 1991, IEEE Corp. Soc. Press 1991, pp. 218–225.

Graele, "Vollano–an Extensible and Parallel Query Evaluation System", IEEE Transactions on Knowledge and Data Engineering, vol. 6, Iss: 1, pp. 120––5, Feb. 1994.

*Primary Examiner*—Wayne Amsbury
*Attorney, Agent, or Firm*—Marilyn Smith Dawkins

[57] ABSTRACT

The present invention provides a system and method for retrieving data from a computerized database system. Prior to execution of a query statement, the system determines an optimal sequential execution plan for the query statement. The optimal sequential execution plan is used to determine an optimal parallel execution plan. During the execution of the query, run time variables are used to determine whether to use the sequential execution plan without modification or a modification of the parallel execution plan.

8 Claims, 7 Drawing Sheets

HIGH LEVEL FLOW OF THE QUERY OPTIMIZATION PROCESS AT BIND TIME

SYSTEM AND METHOD FOR OPTIMIZING PARALLEL PROCESSING OF DATABASE QUERIES

FIELD OF THE INVENTION

This invention relates to processing queries in computer database systems and more particularly to a strategy for optimizing the execution of a database query.

BACKGROUND OF THE INVENTION

Database management systems (DBMS) support the definition, retrieval, and updating of data stored in a database. A relational database management system (RDBMS) is a particular form of a database system where data is stored in a tabularized form. The database tables consist of sets of rows which share common characteristics.

The database is physically stored as pages of data on nonvolatile storage devices such as direct access storage devices (DASD). An index can also be stored on DASD listing a directory for locating specific data which aids in the retrieval of that data.

Structured query languages, such as the SQL language, have been developed for relational database systems to access the data in a database. The relational database management systems implement the functions of the SQL language.

An example of a table stored in a relational database system is an EMPLOYEE_SALARY table which stores salary information for all employees of a company or enterprise as follows:

| emp_no | emp_name | dept_no | salary |
|--------|----------|---------|--------|
| 1001 | Sinnite, J | D01 | 20000 |
| 1002 | Williams, J | D01 | 33000 |
| 1003 | Crane, P | D02 | 25000 |

The EMPLOYEE_SALARY table has columns for employee number (emp_no), employee name (emp_name), department number (dept_no) and salary. Within the table, each row lists an employee information set called a tuple comprising the employee number, name, department number and salary for a given employee.

Computer programmers write application programs to access and maintain the data in the database. The application programs are executed by the database management system. The application programs need to be processed by the central processing unit (CPU) of the computer system for execution by the CPU. There are three stages in processing an application program—the precompilation, the compilation (also referred to as bind time) and the execution (also referred to as execution time or run time). During precompilation, all SQL statements are extracted from the application program. The SQL statements are used to access the data from the database.

SQL statements specify what data is wanted but not how to get the data. The relational database management system determines the optimal method for accessing and retrieving the requested data. A strategy is deemed optimal in terms of its minimizing the resource utilization costs. Typically, a query optimizer process is performed, during bind time, to determine an optimal strategy. The optimal query processing strategy is transformed, also during bind time, into a query execution plan which consists of a series of steps executable by the CPU to access the requested data and satisfy the query. During execution time, the execution plan as constructed during bind time is executed. The query execution plans can be stored and executed or re-executed as needed.

The application program can include host variables which can change the execution of the embedded SQL statement. A host variable is a PL/I variable, a C variable, a FORTRAN variable, a COBOL data item, or an assembly language storage area referenced in a SQL statement. During execution time, when the query execution plan is activated and executed, values for the host variables are passed from the application program to the query execution plan.

An example of a SQL statement using a host variable is as follows:

Select MAX(SALARY)

From EMPLOYEE_SALARY

Where DEPT_NO=:dept_no;

The host variable in the preceding Select statement is ":dept_no". The SQL Select statement performs the operation of retrieving the maximum salary for employees in the department specified by the host variable. An EMPLOYEE_SALARY table is accessed to satisfy the preceding query statement. One of the columns (attributes) of the table is dept_no (the employee's department number). The MAX function identifies the maximum salary for the employees in the given department. The host variable dept_no allows the department number for the query to be specified by the application program. During bind time, the value of the host value variable is unknown.

In order to satisfy the preceding query, the query access strategy needs to specify how the EMPLOYEE_SALARY table will be accessed and how the MAX function will be evaluated. The EMPLOYEE_SALARY table can be accessed either using a sequential scan of all the pages of records stored in the DASD or by using an index for the table.

In order to improve the RDBMS performance in evaluating and satisfying queries, it is desirable to exploit the inherent parallelism in multiple CPUs or I/O devices available in the computer system during execution. For example, when performing a sequential table scan of a table that is stored across multiple I/O devices, the table scans on the separate I/O devices can be performed at the same time to reduce I/O time by utilizing the concurrency of multiple asynchronous I/O operations on the devices. Parallelism can also be exploited by using multiple CPUs to evaluate the data according to criteria provided by a query, so that total CPU time is lowered. A more complex parallelism operation involves partitioning the query execution plan among CPUs and executing operations in parallel. The query optimizer needs to consider whether a parallel strategy should be invoked when determining the optimal strategy that minimizes CPU time and resource utilization costs.

A parallel execution plan expresses the degree and unit of parallelism. The degree of parallelism is the number of CPUs and I/O streams (processes) used for each unit of parallelism. The unit of parallelism refers to the group of operations (executable steps in an execution plan) assigned to the same process for execution where there is no blocking for operations within a unit. Blocking occurs when an operation has to wait for another operation to complete. For example, blocking occurs when an operation needs to wait for an intermediate result to be stored in a temporary table.

Finding the optimal parallel execution strategy for a query is a difficult problem because of the large number of different execution strategies available for processing a query (i.e. the large solution space). For a given query, the optimizer may need to decide the sequence of the join operations, the methods of implementing the join operations, the methods for accessing tables and which, if any, indexes to use to access the data on the storage device and to sort the data. In an execution environment (computer system) where parallelism is available, the query optimizer also needs to decide which, if any, operations could be optimized through parallel processing. The optimizer must then further decide how to perform each such operation in a parallel mode. Therefore, finding the optimal parallel execution strategy for a query is considerably more difficult and CPU intensive than determining a sequential execution strategy.

One approach to optimizing queries using parallel execution is to first determine the best sequential query execution strategy. The parallel strategies are then identified based on the best sequential plan. In that way, the time to produce a parallel query execution strategy is reduced by having limited the solution space. The parallel strategy based on the best sequential strategy may not be the optimal strategy compared with all feasible parallel strategies. However, this solution is generally considered to be a good compromise considering the time it would take to find the real optimal parallel strategy.

A parallel execution strategy was proposed by Hong and Stonebraker in "Optimization of Parallel Query Execution Plans in XPRF", Proceedings of the First International Conference on Parallel and Distributed Information Systems, 1991, pp. 218–225. This parallel execution strategy makes a division between the optimization procedures performed during compile or bind time and the optimization strategy that is performed during execution time, with the majority of the work being done during execution time. During bind time, the optimal sequential strategy is determined. Also during bind time, choose nodes are inserted into the sequential plan to enable the modification of the sequential plan during execution time with regard to the join method and the other similar strategies. The actual parallel execution strategy is generated during execution time. Both the unit and degree of parallelism are determined during execution time.

The more work that is done towards generating the execution strategy prior to execution time, the greater the amounts of CPU time and other run time resources are conserved, particularly for queries that are compiled and then re-executed a number of times.

However, the parallel plan should not be entirely determined during bind time. An optimal parallel strategy may seem optimal at bind time but may become sub-optimal during execution time due to the execution time environment variables referred to as "run time" variables, such as the amount of free adjustable buffer pool space, the number of free CPUs and I/O streams, and the values of the run time host variables.

There is a need for a process for determining a parallel execution strategy during bind time to minimize the consumption of execution time while allowing some flexibility to make changes to the plan in response to the run time environment. Particularly for large enterprises running numerous queries on a database, it is important that the compiled logic that is stored for a query be maximized so that only a minimal but sufficient number of decisions are made during execution time. It is also desirable to be able to execute the best sequential plan without modification when the runtime environment is such that the sequential plan would be optimal.

One or more of the foregoing problems are overcome and one or more of the foregoing needs are satisfied by the present invention.

SUMMARY OF THE INVENTION

The present invention provides a system and method for retrieving data from a computerized database system. Prior to the execution of a query statement, the computer system determines an optimal sequential execution plan for the query statement. The optimal sequential execution plan is used to determine an optimal parallel execution plan. During the execution of the query or a set of operations, the values of run time variables and host variables are used to determine whether to execute the sequential execution plan without modification or a modification of the parallel execution plan. The units of parallelism are decided during bind time. When there are no host variables in the query, a preliminary degree of parallelism is decided for each unit of parallelism based on the static information available during bind time. The final degree of parallelism is determined during execution time, based on the values of the run time variables and host variables (if any).

For queries that can be optimally executed using a parallel execution strategy, the query optimizer performs a post-optimization procedure to generate a parallel execution strategy based on the best sequential strategy using only the available static information. During the post-optimization procedure, the unit of parallelism is determined. Post-optimization also determines the bind time parallel decision for each unit, such as the degree of parallelism (when there are no host variables) and how the data or work is to be divided.

For each operation or group of operations that may benefit from parallelism, post-optimization decides how to perform this operation or group of operations in a parallel mode and generates a parallel execution strategy for this operation or group of operations. The strategy is then converted into a set of query execution structures, each consisting of a series of steps driven by the execution flow. The final execution plan may contain more than one parallel execution structure.

It is an object of the invention to provide a flexible parallel query plan which is able to adapt itself based on the run time information, including being able to execute in a sequential mode, without unnecessary overhead. A parallel execution strategy generated at bind time cannot incorporate execution information such as the run time host variable values, resource utilization and other information for such decision making which is not available at bind time. This is significant since, for example, host variable values may change the amount of data that needs to be processed. Resource utilization, such as buffer pools and number of processors, may affect the degree of I/O and CPU concurrency and thus the performance of the plan.

It is an object of the present invention to provide an optimal parallel execution strategy where compiled logic is generated and stored during bind time so that minimal but sufficient decisions are made during execution time.

BRIEF DESCRIPTION OF THE DRAWINGS

Additional objects and features of the invention will be more readily apparent from the following detailed description and appended claims when taken in conjunction with the drawings in which:

DETAILED DESCRIPTION OF THE PREFERRED EMBODIMENT

Figure 1:
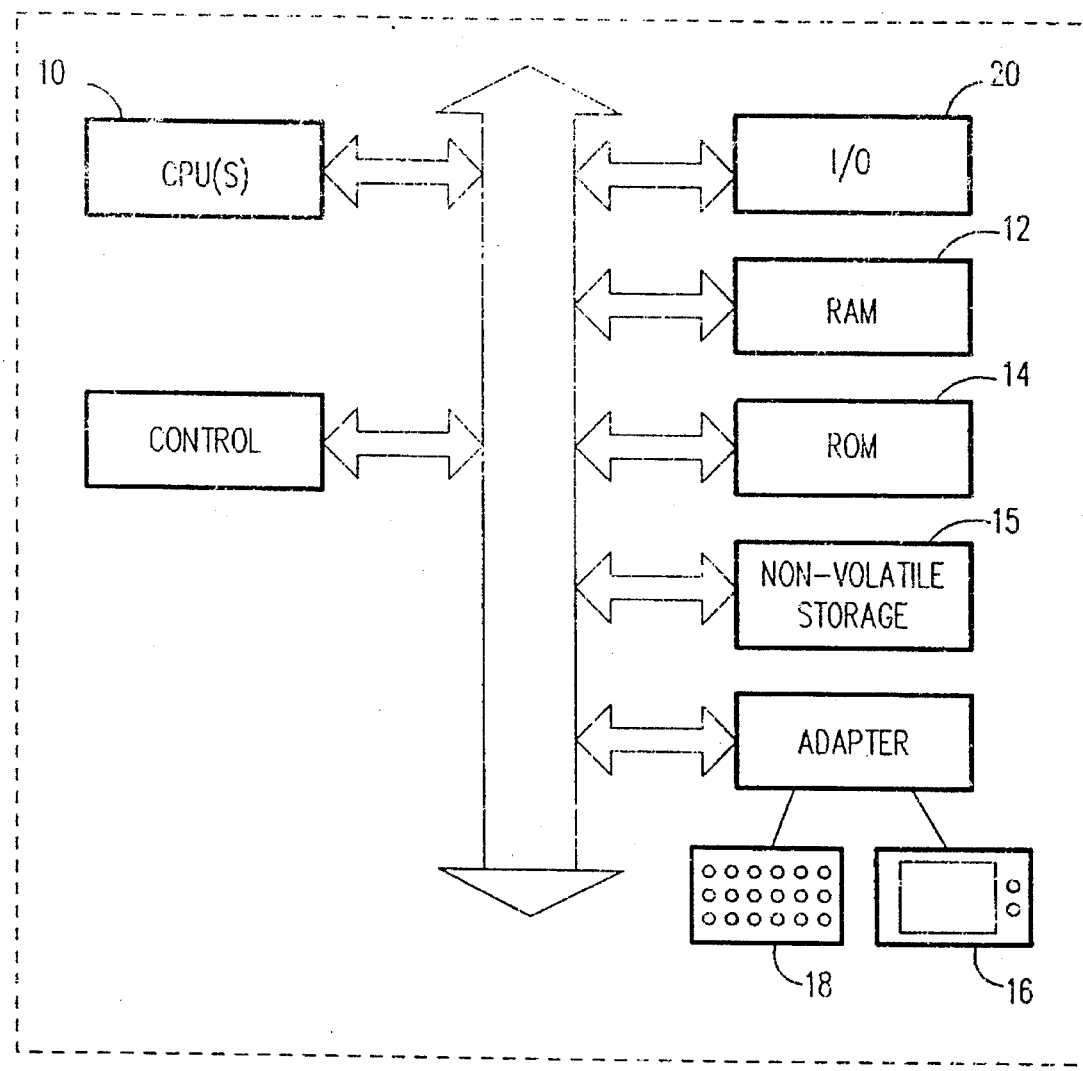
FIG. 1 is a block diagram of a computer system used in implementing the invention.

The data processing system which is utilized for implementing the method and system of the present invention is shown in FIG. 1. The data processing system includes one or more processors 10, a random access memory or RAM 12, a read only memory or ROM 14, at least one non-volatile storage device 15, a computer display monitor 16 and a keyboard 18. One or more I/O devices 20 are connected to the processor 10.

There are many variations of the computer system shown in FIG. 1 known to those skilled in the art for providing the database management system used in the present invention. The invention specified may be implemented using standard programming or engineering techniques. The resulting program or programs may be stored on disk, diskettes, memory cards, ROM or any other memory device. For execution, the program may be copied into the RAM of the computer system. One skilled in the art of computer science will easily be able to combine the software as described with appropriate general purpose or special purpose hardware to create a computer system embodying the invention.

A database user or programmer enters a query to access data stored in the non-volatile storage. The query can be entered directly or as part of a program. During the processing of the query by the CPU, a query optimizer is invoked to determine a strategy for optimizing the execution of the query.

Figure 2:
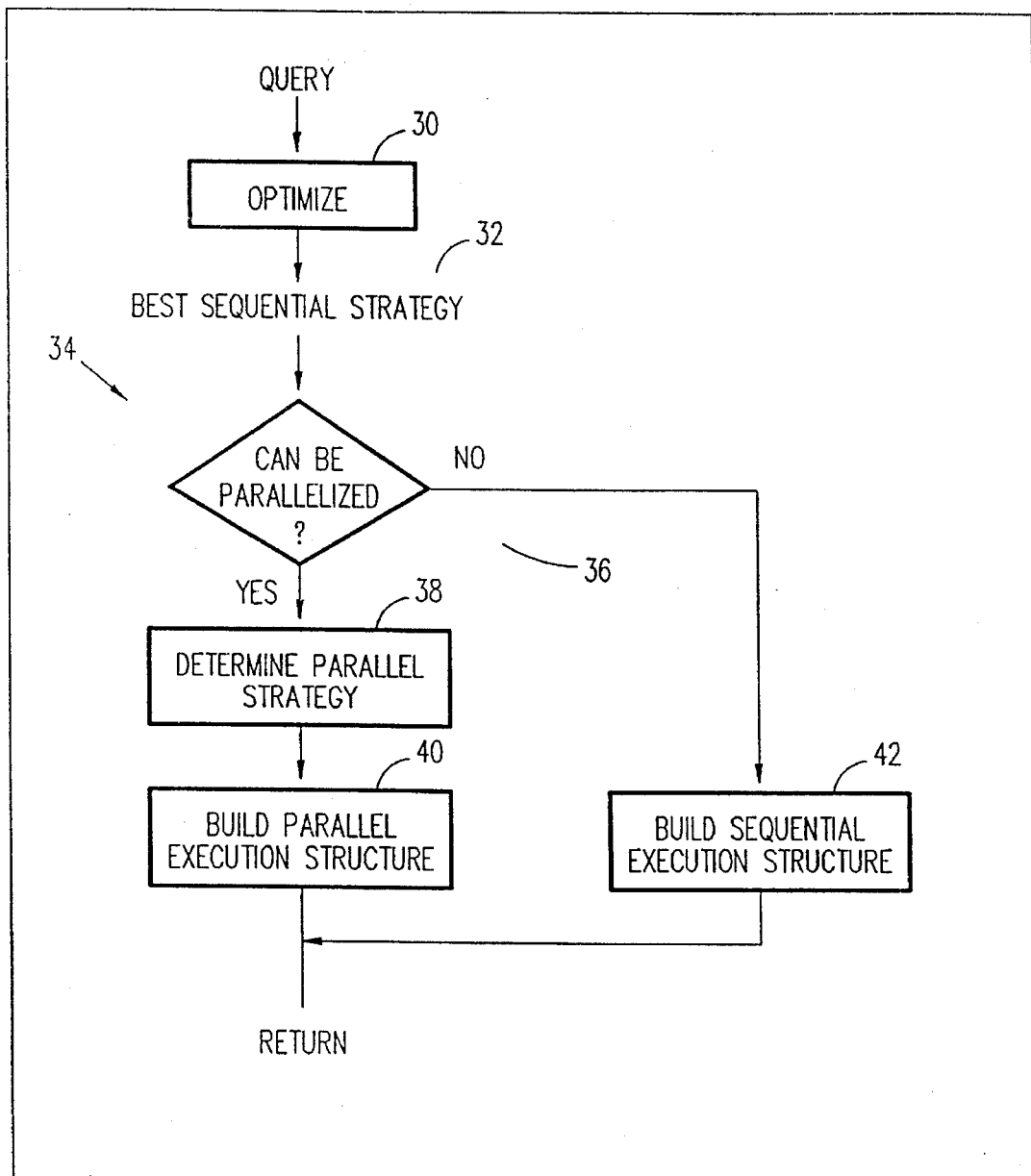
FIG. 2 is a high level flowchart of the query optimization process at bind time.

Referring to FIG. 2, prior to the execution of a query, the RDBMS parses the query and then invokes query optimizer routines to determine a strategy for optimizing the query 30. The optimizer first determines the best sequential strategy 32. During the compilation of the query into executable structures, a post-optimization step 34 is performed to generate a parallel execution strategy based on the optimal sequential strategy using the static information available during bind time.

For each operation or group of operations, a determination is made during post-optimization on how to perform the operation(s) in a parallel mode and a parallel executable structure is generated for each operation or group of operations. The strategy is then converted into a query execution plan consisting of a series of steps driven by execution flow. The final plan can consist of a plurality of parallel query execution structures.

The first determination or decision made during the post-optimization is whether the query can be parallelized 36. This determination is made based on whether a table to be accessed is stored on multiple I/O devices or whether the strategy can logically be divided among CPUs. When a query can be executed in parallel mode, the optimizer determines an optimal parallel strategy given the available static information 38. The parallel strategy includes a determination of how to group the operation within a query statement into a unit without any blocking operations. The result is one or more units of parallelism. A unit is a structure comprising a series of steps to be performed by the execution flow without any blocking (waiting for other operations to complete).

Based on the parallel strategy, a parallel execution structure is built 40. When a query can not be parallelized, a sequential execution structure is built 42, which can be executed without checking at execution time whether the execution environment is such that the query would benefit from parallelization.

When host variables are present in the query, the degree of parallelism and the partitioning heuristics for the parallel strategy must be determined at run time. Otherwise, a preliminary degree of parallelism and partitioning heuristics can be determined during the post-optimization process at bind time. Host variables will not change the decision about the unit of parallelism, and thus this decision is made at bind time. In that way, as much compiled logic as possible is stored for the parallel execution strategy during bind time.

Figure 3:
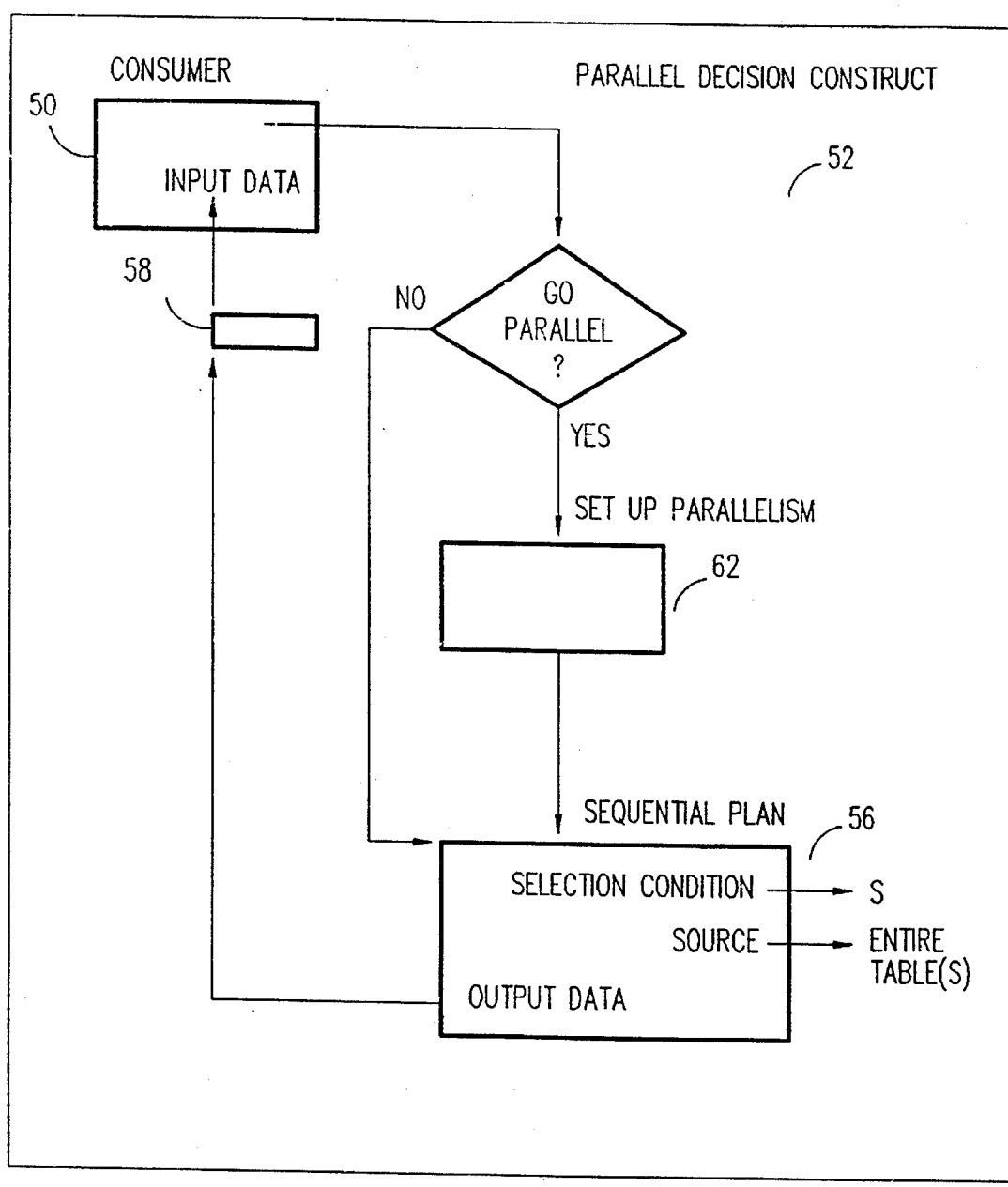
FIG. 3 is a block diagram of the main components of a parallel execution structure.

A parallel execution structure is constructed for each operation or group of operations within a query that can be performed in a parallel mode. The main components of a parallel execution structure are shown in FIG. 3. The consumer component 50 represents the receiving end of the retrieval operation. The consumer component passes the retrieved data to the next stage of the group of operations being optimized, such as sending the data to the user. For example, the group of operations being optimized may correspond to the step of retrieving data from table pages. The consumer passes the retrieved data to the next operation, such as a sort procedure to arrange the data into a certain sequence. The consumer is activated either directly by the user (a direct fetch operation input from a keyboard) or by the next stage of operation, as is the standard procedure for a program execution flow, which is well known to those skilled in the art of computer programming. The consumer performs all necessary preparatory work for the current unit of parallelism (group) and passes the control to the parallel decision construct 52 (53 in FIG. 4).

Figure 4:
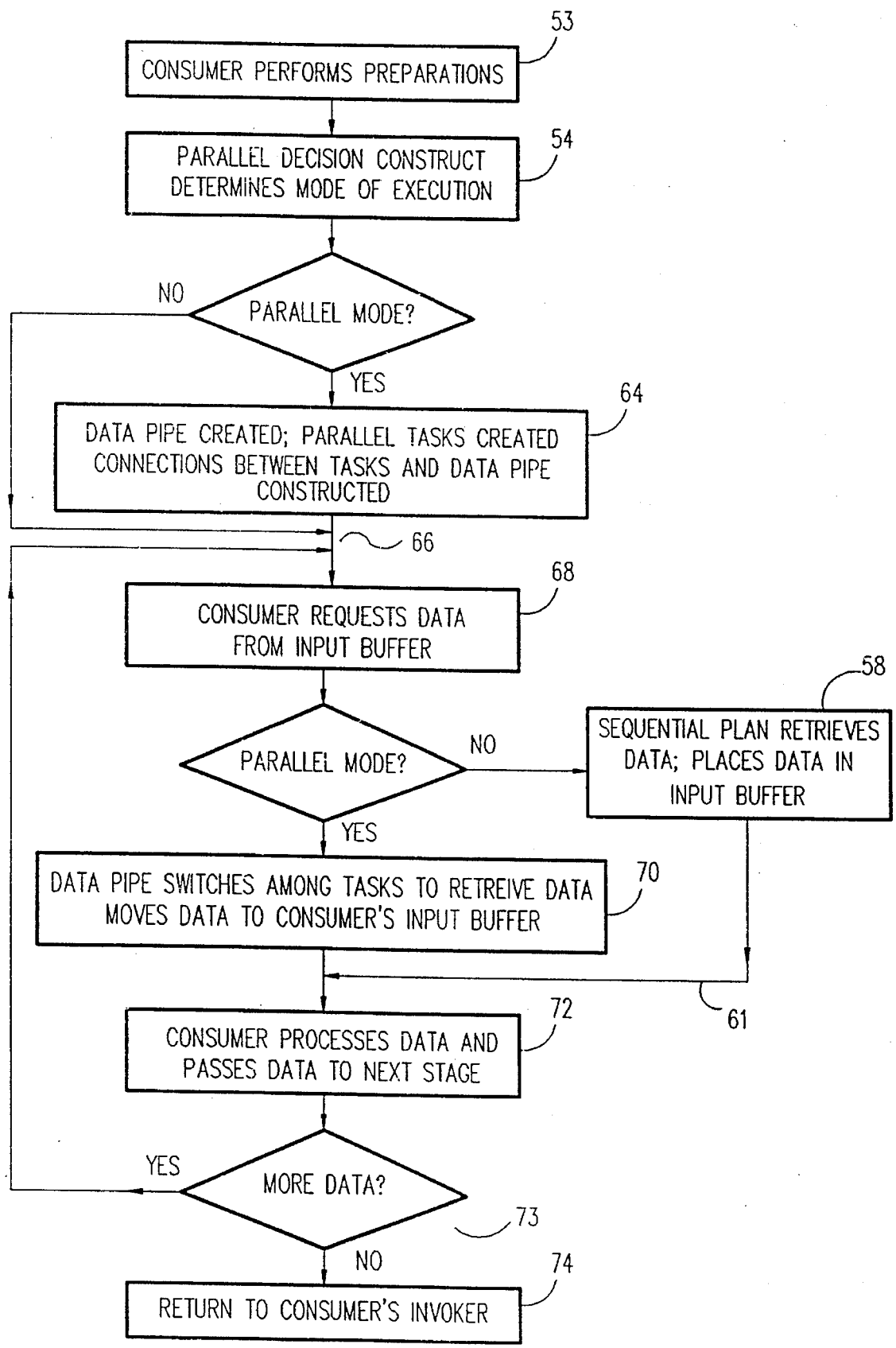
FIG. 4 is a high level flowchart of the query processing at execution time.
Figure 5:
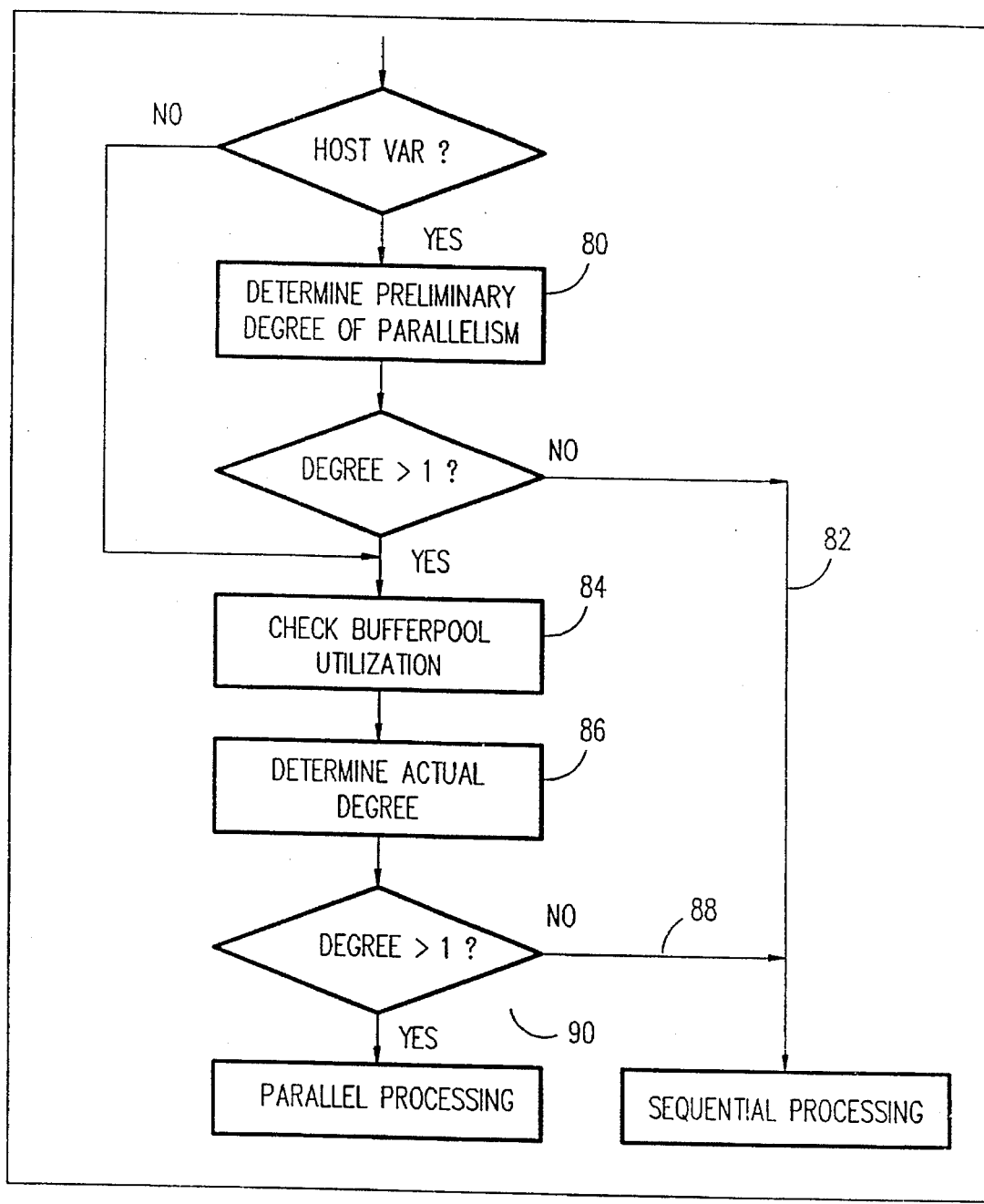
FIG. 5 is a high level flowchart of the process for determining the degree of parallelism based on the execution environment.

The parallel decision construct implements the process for deciding the final degree of parallelism at execution time, which is shown in the FIG. 5 flowchart. The parallel decision construct uses logic to determine whether to execute the query in a parallel mode or a sequential mode (54 in FIG. 4). During the bind time, only static information was considered. This construct uses the execution environment to make a determination of whether an operation or group of operations would be more optimally performed in a parallel mode and also how to perform the operation or group of operations in a parallel mode. The execution time resource utilization variables (run time variables) are checked to determine whether a parallel mode would be feasible and would provide optimal performance. The execution time resources that are checked include the amount of available buffer pool that can be used to hold the input data for concurrent asynchronous I/O operations and the number of free processors. The run time host variable values are also used in determining how much data will be accessed by a query. For example, a predicate of the form "COL>:hostvar", where the host variable is determined at run time, may become highly selective so that a more efficient degree of parallelism exists.

A determination must also be made on how to perform the operation or group of operations in parallel. In particular, a determination must be made about how many asynchronous I/O streams to trigger concurrently and how many CPUs (that are available in the system) to use to process the data. When there is only one CPU, multiple asynchronous I/O operations can still be triggered to reduce the I/O wait time for I/O intensive queries. These determinations are referred to as the degree of parallelism. The degree of parallelism is the number of processes (I/O and CPU threads) that are to be used to execute an operation or set of operations. Typically, the degree of parallelism needs to be as high as possible. However, the degree should not be so high as to cause a resource contention.

When a query does not contain any host variables, a preliminary degree of parallelism can be determined at bind time. When a host variable is present, the degree of parallelism will be derived fully during execution time. The actual degree of parallelism executed may differ from the preliminary degree since the actual degree is determined after incorporating other execution time information. When the preliminary degree is larger than one (that is, parallelism is to be used), resource utilization information available at run time is incorporated to refine the preliminary degree to the actual final degree of parallelism to ensure that enough resources are available.

When the parallel decision construct makes the determination to use the sequential plan, the sequential plan component (56 in FIG. 3) as constructed during bind time is run without modification (58 in FIG. 4). The sequential plan component provides the capability of executing the parallel structure determined during bind time in a sequential mode. The output buffer of the sequential plan has been set to the input buffer of the consumer (60 in FIG. 3) to return the results of the plan execution to the consumer. After the sequential plan is executed, execution control is transferred back to the consumer (61 in FIG. 4). At most, the only major extra overhead for sequential execution structure using this invention is the time spent during bind time on the parallel decision construct. The sequential plan is not modified but rather remains ready to execute each time this same query is invoked. The sequential plan (56 in FIG. 3) provides a set of selection conditions (the Where clause in SQL) and the source for performing the operation or set of operations (the tables).

When the parallel decision construct determines that parallelism is to be utilized, the parallelism construct is triggered and execution control is transferred to the parallelism set-up component (62 in FIG. 3) which will set up the parallel plan. When the decision is made to execute in a parallel mode, new constructs are created (64 in FIG. 4). These constructs include a data pipe and the exact number of replications of the tasks (executable structures) based on the sequential plan for each task. Each parallel task is a replication of the sequential plan. The connections between the data pipe and each task is constructed so the data pipe knows where to retrieve data from a specific task. The data pipe is the means for controlling the flow of execution and is also referred to as a flow control agent, the operation of which is well known to those skilled in the art. The data pipe manages the flow control between the consumer and each of the parallel tasks.

Referring to FIG. 4, after the preparation is completed, the execution control is transferred back to the consumer 66. The consumer requests data from the input buffer 68. When a sequential mode is to be used, the execution control is transferred to the sequential plan and the data is returned in the input buffer that was properly set up during bind time 58. When a parallel mode is to be executed, the execution control is transferred to the data pipe. The data pipe activates the individual tasks and switches among the tasks to retrieve data 70, in order to minimize the amount of waiting, or to put the data into a specified sequence.

When the execution control is passed back to the consumer, the consumer processes the data and passes it to the next stage of operation when necessary 72. When the data is exhausted 73, the execution control returns back to the consumer's invoker 74.

The number of tasks needed to be executed in parallel for the operation or group of operations is determined by the degree adapting process. Each task is replicated using the original sequential plan as the model. As a result, the same set of selection criteria as in the original sequential plan is used for each task. There are some modifications which need to be made such as determining a partition criteria for the data and the buffer for the output data where the data pipe picks up the data. The sequential plan works on the entire table, whereas a parallel task works on a partition of a table. By activating multiple parallel tasks, multiple partitions of the same table can be processed simultaneously. The strategy to partition the access of a table is first determined at bind time using static information and later is modified using dynamic information at runtime. The partition of data for which each active set is responsible is specified during execution time.

The buffers for the output data, into which various parallel tasks output their results, are modified so that the buffers are unique among each other. It is the responsibility of the data pipe to move the result from the output buffer of each task to the input buffer of the consumer.

It is possible that a different parallel decision may be made for the next execution of the same query. Similar logic will be repeated with each identical or different parallel decision based on the environment at the time of the execution of the query.

During the execution of the query, the bind time parallel execution structure is activated. First the structure is relocated so that it can be executed. This is a common procedure among all programs which use virtual memory and is well know to those skilled in the field. The process involves converting the offset address in a plan into a real address in memory. Next, in the parallel execution structure, execution control is transferred to the consumer and the parallel decision construct gets control. After the parallel decision construct is finished executing, the consumer gets the control back and either executes in a sequential mode or a parallel mode. After the query operations are executed, execution control is passed back to the consumer. Once the data is exhausted, the execution control returns back to the consumer's invoker.

Referring to FIG. 5, a flowchart of the process for determining the degree of parallelism during execution time is shown. When the query contains a host variable, a determination of the preliminary degree of parallelism 80 is first made during execution. When the degree is equal to "1", then sequential processing will be implemented 82. The resource (e.g. buffer pool) utilization is checked 84 and a decision is made on the actual degree of parallelism 86. When the final actual degree of parallelism is equal to "1", sequential processing is implemented 88. Otherwise, parallel processing is implemented 90.

An example will now be described of a parallel query optimization of a query in conjunction with the following EMPLOYEE_SALARY table:

| emp_no | emp_name | dept_no | salary |
|--------|----------|---------|--------|
| 1001 | Sinnite, J | D01 | 20000 |
| 1002 | Williams, J | D01 | 33000 |
| 1003 | Crane, P | D02 | 25000 |

The following query will be optimized with respect to parallelism processing:

Select MAX(SALARY)

From EMPLOYEE_SALARY

Where DEPT_NO=host variable dept_no.

Figure 6:
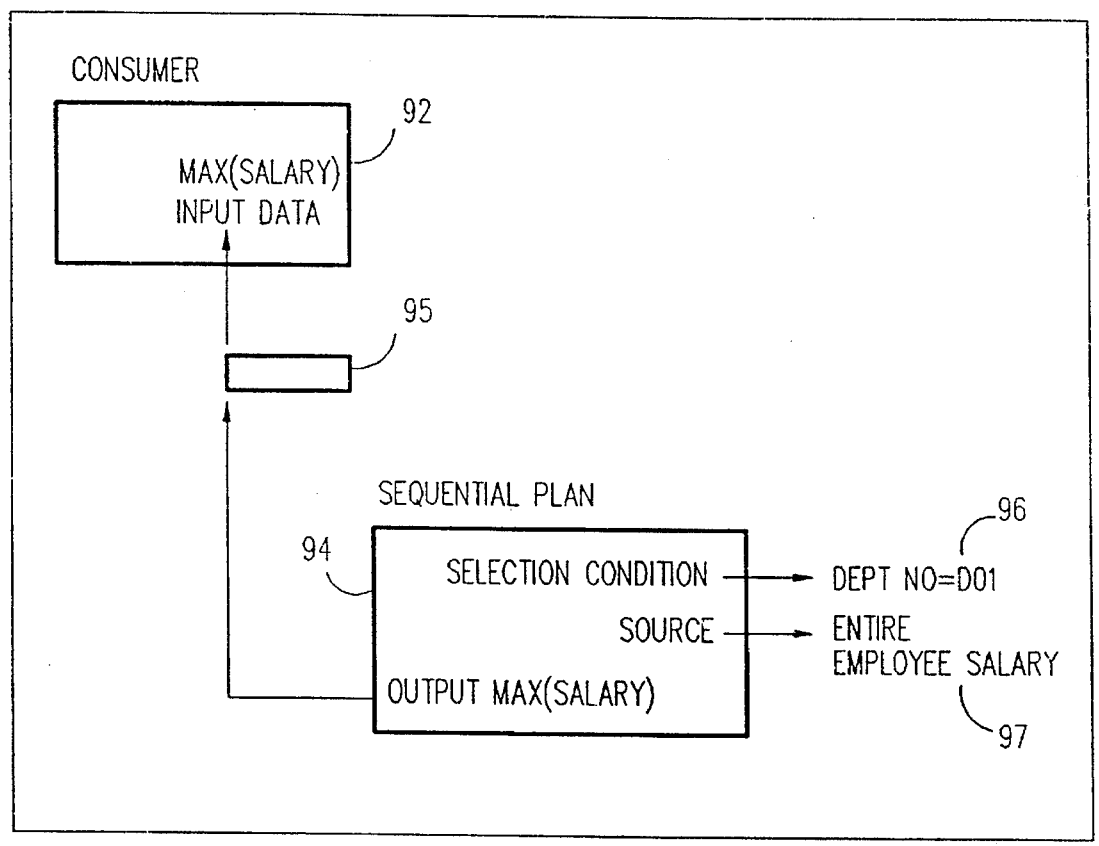
FIG. 6 is a block diagram of a parallel execution structure transformed for a sequential mode.

Referring to the query execution structure in FIG. 6, the value of the host variable department number is "D01"; and the table EMPLOYEE_SALARY is stored on two DASDs, where the data is divided between the DASDs based on the column emp_no. The rows containing emp_no values between 1 and 1000 are stored on the first DASD and the remaining rows where emp_no is higher than 1000 are stored on the second DASD.

FIG. 6 illustrates a query execution structure at the beginning of the execution time. When executing in the sequential mode, this execution structure is used without modification. The active components are the consumer 92 and the sequential plan 94. The sequential plan searches through the entire table including both DASDs sequentially to find the maximum of all salaries for those employees in department number D01. The execution strategy follows the one specified in the best sequential plan.

More specifically, the input buffer 95 of the consumer requests a MAX(SALARY) value. The sequential plan is activated, the selection condition is DEPT_NO=D01 96 and the source is the entire EMPLOYEE_SALARY table 97. The output from the sequential plan for the MAX(SALARY) function is returned to the consumer input buffer 95.

Figure 7:
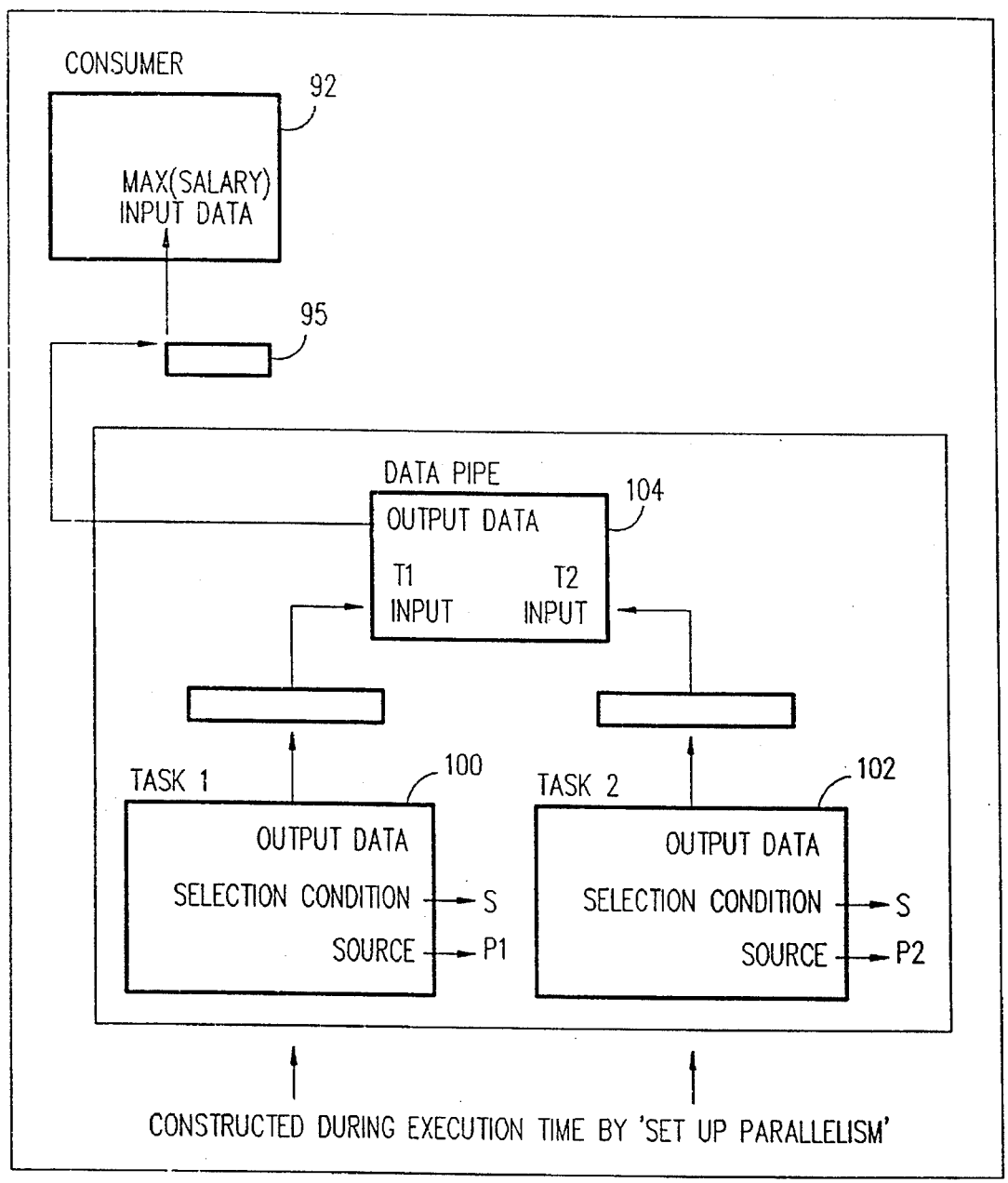
FIG. 7 is a block diagram of a parallel execution structure transformed for parallel mode.

FIG. 7 illustrates the active components of the parallel execution structure for the example query when the parallel mode is chosen as being the most efficient. The parallel decision construct determines the degree of parallelism to be two and that each of the two parallel tasks 100, 102 is assigned the rows on one of the two DASDs P1 and P2. The first task will only scan the rows where the emp_no is between 1 and 1000 (P1) and the second task will scan the rows starting emp_no equal to 1001 and higher numbers (P2). In this example, both parallel tasks use the same set of searching criteria of DEPT_NO=D01 (S). But, there are two sources of data, DASD 1 (P1) and DASD 2 (P2).

Since parallelism is chosen, the original sequential plan is not activated. However, each of the two parallel tasks is replicated based on the original sequential plan. The consumer 92 still receives input from the same buffer 95. However, the input data comes from the data pipe 104 instead of the sequential plan 94. Since every parallel task is returning the maximum of the salaries from the qualifying rows in each DASD, either the data pipe or the consumer needs to perform a final aggregation to derive the maximum among the parallel tasks.

The parallel execution structure is constructed during execution time by the Setup Parallel construct (62 in FIG. 3). The consumer sends a request for input data for the maximum salary. The data pipe receives input from the two tasks that are running in parallel on the same selection criteria but on two sets of data sources.

It is an advantage of the present invention that the bind time decision constructs can be modified during execution time to improve performance. The parallel query execution structure is highly compiled before execution. Just enough decisions are made during execution to modify the execution construct according to the execution environment. Using the logic provided in the execution structure, the execution structure is able to adapt itself based on the value of the execution time parameters. In that way, the present invention provides flexibility at minimum execution cost.

The query can be degenerated to a sequential mode easily using the sequential plan constructed during bind time when it is determined that the sequential mode is more efficient. Because the sequential execution structure remains unchanged in the parallel plan, it is easy to degenerate the execution to a sequential mode at execution time. Furthermore, because this sequential plan is the finalized best sequential plan, no more modification is required.

The task replication process is simple and dynamic. Once the execution logic decides to use the parallel mode, the exact number of tasks can be replicated based on the sequential plan. The replication logic is very simple and is well known to those skilled in the art. Also, there is no need to store a fixed number of parallel tasks. Therefore, the replication process is dynamic and efficient.

While the invention has been particularly shown and described with reference to the preferred embodiment, it will be understood that various changes of form and detail may be made without departing from the spirit and scope of the invention as defined by the appended claims.

We claim:

1. A method for retrieving data from a computerized database system having at least one processor, a memory, and at least one non-volatile storage system, using a query statement to identify data to be retrieved, comprising the steps performed by the database of:

(a) during compile time:
(i) determining an optimal sequential execution plan for the query statement, and
(ii) determining an optimal parallel execution plan based on said optimal sequential execution plan, and based on available resource information; and (b) during run time:
(i) determining, based on a value of at least one run time variable, whether to use said sequential execution plan without modification or a modification of said parallel execution plan as an optimal run time execution plan, and
(ii) executing said query statement using said optimal run time execution plan.

2. The method of claim 1, further comprising the step of modifying said parallel execution strategy based on the value of at least one run time variable.

3. The method of claim 1, further comprising the step of determining units of parallelism during compile time.

4. The method of claim 3, further comprising the steps of:

determining whether a host variable is present in the query;

when a host variable is present in the query, determining a degree of parallelism for each of said units of parallelism during run time; and when a host variable is not present in the query, determining a preliminary degree of parallelism during compile time and a final degree of parallelism based on the preliminary degree of parallelism during run time.

5. The method of claim 1, wherein the run time variables comprise the number of CPUs and the amount of available buffer space.

6. A system for retrieving data from a computerized database system having a plurality of processors, a memory, and a plurality of non-volatile storage devices, comprising:

means for determining an optimal sequential execution plan for a query statement during compile time;

means for determining, during compile time, an optimal parallel execution plan for the query statement based on the optimal sequential plan and the static information available at compile time;

means for determining during run time, based on a value of at least one run time variable, whether to use said sequential execution plan without modification or said parallel execution plan as an optimal run time execution plan; and means for executing said query statement using said optimal run time execution plan.

7. The system of claim 6, further comprising means for modifying said parallel execution plan based on the run time variables.

8. A system for retrieving data from a computerized database system having a memory, at least one processor, and at least one non-volatile storage device, comprising:

means for determining an optimal sequential plan for executing a query statement;

means for determining whether the query statement contains a host variable;

means for determining one or more units of parallelism for the query statement based on the sequential plan;

means for determining, at compile time, a preliminary degree of parallelism for each unit of parallelism based on the static run time environment information available during compile time; and means for modifying the preliminary degree of parallelism based on the values of the run time variables.

* * * * *